United States Patent
Jöngren et al.

(10) Patent No.: US 9,072,055 B2
(45) Date of Patent: Jun. 30, 2015

(54) SYSTEMS AND METHODS FOR CONTROLLING THE POWER AT WHICH A COMMUNICATION DEVICE TRANSMITS AN UPLINK SIGNAL

(75) Inventors: George Jöngren, Stockholm (SE); Per Burström, Lulea (SE); Arne Simonsson, Gammelstad (SE); Stefano Sorrentino, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 453 days.

(21) Appl. No.: 13/528,080

(22) Filed: Jun. 20, 2012

(65) Prior Publication Data

US 2012/0329503 A1 Dec. 27, 2012

Related U.S. Application Data

(60) Provisional application No. 61/499,542, filed on Jun. 21, 2011.

(51) Int. Cl.
*H04B 7/00* (2006.01)
*H04W 52/10* (2009.01)
*H04W 52/24* (2009.01)
*H04W 52/08* (2009.01)
*H04W 52/14* (2009.01)

(52) U.S. Cl.
CPC .............. *H04W 52/10* (2013.01); *H04W 52/08* (2013.01); *H04W 52/146* (2013.01); *H04W 52/244* (2013.01); *Y02B 60/50* (2013.01)

(58) Field of Classification Search
CPC .... H04W 52/146; H04W 52/08; H04W 52/10
USPC .......... 455/509, 522, 69, 68, 127.1, 445, 500, 455/517, 515, 513, 67.11, 524, 525, 455/436–444, 422.1, 403, 550.1, 426.1, 455/426.2, 450–453; 370/328, 329, 343, 370/331, 332, 338
See application file for complete search history.

(56) References Cited

U.S. PATENT DOCUMENTS 8,600,424 B2 * 12/2013 Chen et al. .................... 455/522
2011/0039569 A1 2/2011 Narasimha et al.

(Continued)

OTHER PUBLICATIONS

Ericsson et al., "On Technical Aspects on Heterogeneous Networks", 3GGPP Draft, R1-100061, 3rd Generation Partnership Project (3GPP), Mobile Competence Centre, 650, Route Des Lucioles, F-06921 Sophia-Antipolis Cedex, France, vol. RAN WG1, No. Valencia Spain, Jan. 12, 2010, XP050417808, 4 pages.

(Continued)

*Primary Examiner* — Keith Ferguson
(74) *Attorney, Agent, or Firm* — Rothwell, Figg, Ernst & Manbeck, P.C.

(57) ABSTRACT

According to some embodiments, there is provided a base station system configured to, among other things, (a) detect whether a particular UE is using too much power to transmit uplink data and (b) in response, transmit a message to the UE instructing the UE to detect a power control RS (PCRS) that is intended only for the particular UE. In some embodiments, the PCRS is transmitted such that the power (actual or nominal) of the PCRS as received by the UE is higher than the power of the previous CRS detected by the UE, thereby leading the UE to calculate a lower PL value, which can lead to the UE lowering its output power.

31 Claims, 10 Drawing Sheets

(56) References Cited

U.S. PATENT DOCUMENTS

2011/0098054 A1* 4/2011 Gorokhov et al. ......... 455/452.1
2014/0038660 A1* 2/2014 Malladi et al. ................ 455/522

OTHER PUBLICATIONS

Ericsson et al., "Aspects on Distributed RRUs with Shared Cell-ID for Heterogeneous Deployments", 3GPP Draft, R1-110649_Shared_Cell_ID, 3rd Generation Partnership Project (3GPP), Mobile Competence Centre 650, Route Des Lucioles, F-06921 Sophia-Antipolis Cedex, France, vol. RAN WG1, No. Taipei, Taiwan, Feb. 17, 2011, XP050490740, 11 pages.

International Search Report and Written Opinion issued on Sep. 14, 2012, in corresponding PCT application No. PCT/IB2012/053154, 13 pages.

International Preliminary Report on Patentability issued on Dec. 23, 2013 in corresponding PCT application No. PCT/IB2012/053154, 8 pages.

* cited by examiner

SYSTEMS AND METHODS FOR CONTROLLING THE POWER AT WHICH A COMMUNICATION DEVICE TRANSMITS AN UPLINK SIGNAL

CROSS-REFERENCE TO RELATED APPLICATION

This application claims the benefit of U.S. Provisional Patent Application No. 61/499,542, filed on Jun. 21, 2011, which is incorporated by reference herein in its entirety.

TECHNICAL FIELD

The present disclosure relates to radio communication and in particular to uplink power control in radio communication.

BACKGROUND

In cellular or radio communication networks, a user equipment (UE) such as, for example, a mobile telephone or other communication device, communicates with radio base stations (RBSs) (a.k.a., "nodes") of a Radio Access Network (RAN). Different UEs transmit signals with different transmission powers depending on several factors, such as: distances between the different UEs and the RBS, the number of UEs currently transmitting signals to or receiving signals from the RBS, or the geographical conditions between the different UEs and the RBS. The different transmission powers of the UEs cause several problems or issues which need to be considered. One issue is that the higher the power, the higher is the drain on the battery of the UEs. A further issue, which is much more complicated, is interference. As a UE transmits with relatively high transmission power, the more interference the UE causes other UEs in its vicinity and also to neighbouring RBSs.

In order to address these issues, control of the transmission power of the UE or mobile station has been introduced. Control of mobile radio station transmission power (sometimes referred to as uplink power control) is thus a common feature in cellular systems. Some objectives of uplink power control include: (a) attaining a sufficient received power and signal quality on the used uplink radio channel at the serving RBS, (b) limiting the received power (interference) at non-serving RBSs, (c) limiting the received power (interference) on other channels at the serving RBS, and (d) reducing the output power level to limit power consumption and save battery life in the mobile station.

Power control schemes can further be divided in to the categories 'closed-loop' and 'open-loop' depending on what type of measurement input is used. Closed-loop schemes make use of measurements on the same link direction that the power control applies to, i.e., on the uplink for uplink closed loop power control. Open-loop schemes make use of measurements on the opposite link direction, i.e., on the downlink for uplink open-loop power control. Closed-loop schemes are typically more accurate than open-loop schemes, but also require more control signalling overhead.

Improved support for heterogeneous network operations is part of the on-going specification of 3GPP LTE (Long Term Evolution) Release-10, and further improvements are discussed in the context of new features for Release-11. In heterogeneous networks, a mixture of RBSs having differently sized and overlapping coverage areas are deployed. One non-limiting example is illustrated below where low power RBSs (e.g., a pico RBS, a femto RBS, etc.) are deployed within the coverage area of a high power RBS (e.g., a macro RBS or "macro cell"). In FIG. 1, one macro RBS 100 is shown having a coverage area or cell 101. Within the cell 101, three different low power RBSs 110, 120 and 130 are deployed. For simplicity, we shall refer to low power RBSs as "pico" RBSs. Each of the pico RBSs has a corresponding cell 111, 121 and 131 respectively. In LTE, an RBS may be an evolved Node-B ("eNodeB" or "eNB") or it may be a base station without eNB capabilities, such as a "remote radio unit" (RRU).

Throughout this disclosure, an RBS is often referred to as being of a certain type, e.g., "macro" or "pico". These types are only examples of such RBSs and should not be interpreted as an absolute quantification of the role of the RBS but rather as a convenient way to illustrate the roles of different RBSs relative to each other. Thus, a description about macro and picos could, for example, just as well be applicable to an interaction between micro RBSs and femto RBSs. Other non-limiting examples of low power RBSs include home base stations and relays. A large difference in output power (e.g. 46 dBm in macro cells and 30 dBm or less in pico cells) results in different interference situations as compared to networks where all base stations have the same output power.

Deploying low power nodes (e.g. pico RBSs) within a macro coverage area improves system capacity by cell splitting gains and also provides users with a wide area experience of very high speed data access throughout the network. Heterogeneous deployments also cover traffic hotspots well. Hotspots are small geographical areas with high user densities served by, e.g., pico cells, and they represent an alternative deployment to denser macro networks.

A basic way to operate a heterogeneous network is to apply frequency separation between the different layers, i.e., the different macro and Pico nodes operate on different non-overlapping carrier frequencies, and thereby avoid any interference between the layers. With no macro cell interference towards the under-laid cells, cell splitting gains are achieved when all resources can simultaneously be used by the under-laid cells. A drawback of operating layers on different carrier frequencies is that it may lead to resource-utilization inefficiency. For example, if there is low activity in the pico nodes, it could be more efficient to use all carrier frequencies in the macro cell and then basically switch off the pico nodes. Nevertheless, the split of carrier frequencies across layers is typically done in a static manner.

Another way to operate a heterogeneous network is to share radio resources on the same carrier frequencies by coordinating transmissions across macro cells and under laid cells. In inter-cell interference coordination (ICIC), certain radio resources are allocated for the macro cells during some time period, and the remaining resources can be accessed by the under-laid cells without interference from the macro cell. Depending on the traffic situations across the layers, this resource split can change over time to accommodate different traffic demands. In contrast to the above split of carrier frequencies, this way of sharing radio resources across layers can be made more or less dynamic depending on the implementation of the interface between the nodes. In LTE for example, an X2 interface is specified that allows exchange of different types of information between nodes. One example of such information exchange is that a node can inform other nodes that it will reduce its transmit power on certain resources.

Time synchronization between nodes is required to ensure that ICIC across layers will work efficiently in heterogeneous networks. This is important for time domain-based ICIC schemes where resources are shared in time on the same carrier.

LTE uses Orthogonal Frequency-Division Multiplexing, OFDM, in the downlink and Discrete Fourier Transform, DFT, -spread OFDM in the uplink. The basic LTE physical communication resources can thus be seen as a time-frequency grid, as illustrated in the example in FIG. 2, where each resource element corresponds to one subcarrier during one OFDM symbol interval (on a particular antenna port).

In the time domain, LTE downlink transmissions are organized into radio frames of 10 ms, each radio frame including ten equally-sized subframes of 1 ms as illustrated in FIG. 3. A subframe is divided into two slots, each of 0.5 ms time duration.

The resource allocation in LTE is described in terms of resource blocks, where a resource block corresponds to one slot in the time domain and 12 contiguous 15 kHz subcarriers in the frequency domain. Two consecutive resource blocks (in time) represent a resource block pair and correspond to the time interval upon which transmission scheduling operates Transmissions in LTE are dynamically scheduled in each subframe, where the RBS transmits downlink assignments/ uplink transmission grants to certain UEs via a physical downlink control channel, PDCCH. The PDCCH signals are transmitted in the first OFDM symbol(s) in each subframe and span (more or less) the whole system bandwidth. A UE that has decoded a downlink assignment carried by a PDCCH knows which resource elements in the subframe that contain data aimed for the UE. Similarly, upon receiving an uplink transmission grant, the UE knows which time/frequency resources it should transmit upon. In LTE downlink, data is carried by the physical downlink shared channel, PDSCH, and in the uplink, the corresponding data channel is referred to as the physical uplink shared channel, PUSCH.

Demodulation of transmitted data requires estimation of the radio channel which is done by using transmitted reference symbols, RSs, i.e. symbols already known by the receiver. In LTE, cell-specific reference symbols (CRSs) are transmitted in all downlink subframes, and in addition to assisting downlink channel estimation, they are also used for mobility measurements and for uplink power control performed by the UEs. LTE also supports UE-specific RS aimed only for assisting channel estimation for demodulation purposes.

FIG. 4 illustrates a mapping of physical control/data channels and signals onto resource elements within a downlink subframe. In this example, the PDCCHs occupy the first out of three possible OFDM symbols, so in this particular case the mapping of data could start at the second OFDM symbol. Since the CRS is common to all UEs in the cell, the transmission of CRS cannot be easily adapted to suit the needs of a particular UE. This is in contrast to UE-specific RS where each UE has RS of its own placed in the data region of FIG. 4 as part of the PDSCH.

The length of the control region, which can vary on subframe basis, is conveyed in the Physical Control Format Indicator Channel, PCFICH. The PCFICH is transmitted within the control region at locations known by UEs. After a UE decodes the PCFICH, it knows the size of the control region and in which OFDM symbol the data transmission starts.

Also transmitted in the control region is the Physical Hybrid-ARQ Indicator Channel. This channel carries ACK/ NACK responses to a UE to inform if the uplink data transmission in a previous subframe was successfully decoded by the base station or not.

Before a UE can communicate with an LTE network it first has to find and acquire synchronization to an RBS within the network, i.e., performing cell search. Then it has to receive and decode system information needed to communicate with and operate properly within the RBS, and finally access the RBS by a random-access procedure.

In order to support mobility, a UE needs to continuously search for, synchronize to, and estimate the reception quality of both its serving RBS and neighbour RBSs. The reception quality of the neighbour RBSs, in relation to the reception quality of the serving RBS, is then evaluated in order to conclude if a handover (for UEs in connected mode) or cell re-selection (for UEs in idle mode) should be carried out. For UEs in connected mode, the handover decision is taken by the network based on measurement reports provided by the UEs. Examples of such reports are reference signal received power (RSRP) and reference signal received quality (RSRQ). Depending on how these measurements, possibly complemented by a configurable offset, are used, the UE can for example be connected to the RBS with the strongest received power, the RBS with the best path gain, or something between the two.

These selection strategies do not result in the same RBS selection as the RBS output powers may differ. This is sometimes referred to as link imbalance. For example, looking at FIG. 5, the output power of a pico RBS 510 (e.g., a relay) is in the order of 30 dBm or less, while a macro RBS 500 can have an output power of 46 dBm. Consequently, even in the proximity of the pico RBS 510, the downlink signal strength from the macro RBS 500 can be larger than that of the pico RBS 510. From a downlink perspective, it is often better to select an RBS based on downlink received power, whereas from an uplink perspective, it would be better to select an RBS based on the path loss.

In the above scenario, it might be better, from a system perspective, for a UE to connect to the pico RBS 510 even if the macro downlink is much stronger than the pico downlink. However, ICIC across layers would be needed when UEs operate within the region of the UL border 511 and the DL border 512. This area is also referred to as the link imbalance zone. Some form of interference coordination across the cell layers is especially important for the downlink control signalling. If this interference situation is not handled appropriately, a UE in the region between the DL and UL borders in FIG. 5 and connected to the pico RBS 510 cannot receive the downlink control signalling from the pico RBS 510.

One approach for providing ICIC across layers is illustrated in FIG. 6, where an interfering macro RBS (downlink interference towards a pico RBS) avoids scheduling unicast traffic in certain subframes implying that neither PDCCHs nor PDSCH occur in those subframes. In such way, it is possible to create low interference subframes, which can be used to protect pico users operating in the link imbalance zone, a pico user being a UE connected to the pico RBS. The macro RBS indicates via a backhaul interface X2 to the pico RBS which subframes it will avoid scheduling UEs within. The pico can then take this information into account when scheduling UEs operating within the link imbalance zone; such that these UEs are scheduled in subframes aligned with the low interference subframes at the macro layer, i.e. in interference protected subframes. However, pico cell UEs operating within the DL border can be scheduled in all subframes, i.e. in both protected and non-protected subframes.

In principle, data transmission in different layers could also be separated in the frequency domain by ensuring that scheduling decisions in the two cell layers are non-overlapping in the frequency domain, e.g., by exchanging coordination messages between the different RBSs. For control signalling, this is difficult according to the LTE specifications where control signalling spans the full bandwidth, and hence, a time-domain approach may be preferable.

One way to deploy a network is to let different RBSs (e.g., transmission/reception points) form separate cells. In other words, signals transmitted from or received at a point are associated with a cell-id that is different from the cell-id employed for other nearby points. Typically, each point transmits its own unique signals for broadcast (e.g., Physical Broadcast Channel, PBCH) and synchronisation channels (e.g., Primary Synchronisation Signal, PSS, and Secondary Synchronisation Signal SSS).

The concept of a point is often used in conjunction with techniques for coordinated multipoint (CoMP). In this context, a point corresponds to a set of antennas covering essentially the same geographical area in a similar manner. Thus a point might correspond to one of the sectors at a site, but it may also correspond to a site having one or more antennas all intending to cover a similar geographical area. Often, different points represent different sites. Antennas correspond to different points when they are sufficiently geographically separated and/or having antenna diagrams pointing in sufficiently different directions. CoMP techniques introduce dependencies in the scheduling or transmission/reception among different points, in contrast to conventional cellular systems where a point from a scheduling point of view is operated more or less independently from the other points.

This typical strategy of one cell-id per point is depicted in FIG. 1 for a heterogeneous deployment where a number of low power (pico) RBSs are placed within the coverage area of a higher power macro RBS. Similar principles also apply to classical macro-cellular deployments where all points have similar output power and perhaps placed in a more regular fashion than what may be the case for a heterogeneous deployment. In FIG. 1, macro RBS 100 is illustrated having a coverage area 101. The coverage area 101 has cell-id 1. Within coverage area 101, three different low power RBSs 110, 120 and 130 are deployed. Each low power RBS has a coverage area 111, 121 and 131 respectively. The three different coverage areas have their own specific cell-id, i.e. pico cell 111 has cell-id 2, pico cell 121 has cell-id 3 and pico cell 131 has cell-id 4.

An alternative to the typical deployment strategy is to instead let all the UEs within the geographical area outlined by the coverage of the high power macro point be served with signals associated with the same cell-id. In other words, from a UE perspective, the received signals appear to be coming from a single cell. Looking at FIG. 1, all cells 101, 111, 121 and 131 have the same cell-id, e.g. cell-id 1. Only one macro RBS 100 is shown, and other macro points would use different cell-ids (corresponding to different cells) unless they are co-located at the same site (corresponding to other sectors of the macro site). In the latter case of several co-located macro points, the same cell-id may be shared across the co-located macro-points and those pico points that correspond to the union of the coverage areas of the macro points. Synchronisation, Broadcast Channel, BCH, and control channels are all transmitted from the high power point while data can be transmitted to a UE also from low power points by using shared data transmissions PDSCH relying on UE specific RS. Such an approach has benefits for those UEs capable of PDSCH based on UE-specific RS, while UEs only supporting CRS for PDSCH (which is likely to at least include all LTE Release 8/9 UEs for Frequency Division Duplex, FDD) must settle with the transmission from the high power point and thus will not benefit in the downlink from the deployment of extra low power points.

The single cell-id approach is geared towards situations in which there is fast backhaul communication between the points associated to the same cell. An example case might be an RBS serving one or more sectors on a macro level as well as having fast fibre connections to remote radio units (RRUs) playing the role of the other points sharing the same cell-id. Those RRUs could represent low power points with one or more antennas each. Another example is when all the points have a similar power class with no single point having more significance in than the others. The RBS handles the signals from all RRUs in a similar manner.

An advantage of the shared cell approach compared with the typical approach is that the typical handover procedure between RBSs only needs to be invoked on a macro basis. Another advantage is that interference from CRS are greatly reduced since CRS do not have to be transmitted from every point. There is also greater flexibility in coordination and scheduling among the points so the network can avoid relying on the inflexible concept of semi-statically configured "low interference" subframes, as illustrated in FIG. 6. A shared cell approach also allows decoupling of the downlink with the uplink so that for example path loss based reception point selection can be performed in uplink while not creating a severe interference problem for the downlink, where the UE may be served by a transmission point different from the point used in the uplink reception. Typically, this means that the UE's uplink transmissions are received by a pico point, while the UE receives downlink transmissions from the macro point.

According to 3GPP Release-10 LTE, uplink power control (UL PC) is performed by estimating a path loss (PL) term and combining it with various UE-specific and cell-specific power offset terms. An example power control (PC) formula from Rel-10 is in the form $$P = \min(P_{max}, 10 \log 10(M + P_0 + \alpha * PL + C)) \text{ [dBm]} \quad (1)$$

where $P_{max}$ represents a cap on the output power (in dBm), M represents the scheduled UL bandwidth, $P_0$ is a UE- and/or cell-specific power offset, $\alpha$ is a cell-specific fractional path loss compensation factor, PL is an estimate of the path loss performed by the UE and C is a correction term possibly obtained as a combination of multiple power correction terms, possibly including closed-loop power control correction terms.

The UE estimates the path loss PL based on the difference (in dB) between the received power for cell-specific common reference signals (CRS) and the nominal power of such reference signals $$PL = \text{referenceSignalPower} - \text{higher layer filtered RSRP} \quad (2)$$

wherereferenceSignalPower is configured by higher layer signalling and RSRP is defined for the reference serving cell. Filtering of the RSRP may be configured by higher layer signalling and performed by the UE. The serving cell chosen as the reference serving cell and used for determining referenceSignalPower and higher layer filtered RSRP is configured by the higher layer parameter pathlossReferenceLinking.

A problem with uplink power control is that decoupling the downlink operations from the uplink operations does not apply to the UE's open loop part of the output power setting because the UE regulates its transmit power based on the CRS's and a reference power level transmitted by the RBS. In some cases, the open loop part of the power control may completely determine the output power, e.g., when the UE is only using open-loop power control. In case the UE is served by a macro RBS in the downlink, the RSRP measurement that determines transmit power will not take the pico RBSs into account, which means that the UE will transmit with a power level that causes the received power in the pico RBS to be far above what is determined by the UE-specific and/or cell-specific power offset P0. The network may then employ closed loop power control to steer the UE's output power to a value that it sees fit. This can be done by sending transmit power commands, TPCs, in uplink grants to the UE. The TPC is a two-bit instruction and can be either an absolute setting or an accumulative value. The accumulative value, which would be required to control the power over a large dynamic range, takes one of the four values [−1, 0, 1, 2] dB.

Due to the uneven output powers of the different RBSs and since the CRS are shared between macro and pico RBSs in a shared cell-ID setting, the UE power control will be detrimental towards achieving area splitting gains. Because the macro RBS has a much higher output power than pico RBSs, UEs that could be served by a pico RBS in the uplink will too often regulate their transmit power towards the macro RBS even though the macro RBS has a much lower path gain that the pico RBS. This power output will likely create excessive interference within the cell and thereby degrade the possibility of multi-user access (e.g., SDMA) within the cell. Also, the UE power consumption will be unnecessarily high if a too high output power is used.

SUMMARY

An object is to obviate at least some of the problems outlined above. In particular, it is an object to control the power at which a communication device (e.g., a UE) transmits an uplink signal. Advantageously, according to some embodiments, there is provided a base station system configured to, among other things, (a) detect whether a particular UE is not using an appropriate amount of power to transmit uplink data (e.g., the base station system may be configured to determine whether the US transmit power is too high) and (b) in response, transmit a message to the UE instructing the UE to detect a power control RS (PCRS) that is intended only for the particular UE. In some embodiments (e.g., embodiments where the UE transmit power is higher than desired), the PCRS is transmitted such that the power (actual or nominal) of the PCRS as received by the UE is higher than the power of the previous CRS detected by the UE, thereby leading the UE to calculate a lower PL value, which can lead to the UE lowering its output power.

In one particular aspect, there is provided a method for controlling dynamically the power at which a communication device transmits an uplink signal. In some embodiments, the method includes: transmitting data to the communication device from a first radio base station (RBS) (e.g., a macro RBS such, for example, as a macro eNB); determining, based on the power of a first uplink signal received at a second RBS (e.g., a picoRBS such, for example, as a pico eNB) and transmitted by the communication device, whether the transmission power of the communication device should be adjusted (e.g., decreased or increased); and in response to a determination that the transmission power of the communication device should be adjusted, transmitting from the first RBS and/or the second RBS, a communication device specific reference signal. The communication device is configured such that the communication device receives the reference signal(s), determines a measure of uplink transmission power level based on the received reference signal(s), and transmits a second uplink signal at the determined power level. The step of determining whether the transmission power of the communication device should be adjusted may comprise determining the power of the first uplink signal and determining whether the determined power of the first uplink signal exceeds a threshold. In other embodiments it may comprise determining the power of the first uplink signal and determining whether the determined power of the first uplink signal is lower than a threshold.

In some embodiments, in response to a determination that the transmission power of the communication device should be adjusted, the first RBS is used to transmit the communication device specific reference signal. In other embodiments the second RBS is used to transmit the communication device specific reference signal. In still other embodiments, the communication device specific reference signal is transmitted by both the first RBS and the second RBS in response to a determination that the transmission power of the communication device should be adjusted. In such an embodiment, the communication device is configured such that the communication device combines the reference signal transmitted from the first RBS with the reference signal transmitted by the second RBS and uses the combined reference signals to determine the measure of uplink transmission power level.

In some embodiments, a controller of the second RBS transmits a message to a controller of the first RBS in response to the determination that the transmission power of the communication device should be adjusted, and the second RBS is used to transmit the reference signal after the message is transmitted to the first RBS. In some embodiments, in response to receiving the message transmitted from the second RBS, the first RBS is used to transmit to the communication device reference signal information (RSI), wherein the RSI indicates the resources that the second RBS will use to transmit the reference signal. In some embodiments, the controller of the first RBS transmits the RSI to the controller of the second RBS in response to receiving the message transmitted from the second RBS, and the second RBS is used to transmit the reference signal using the resources identified by the RSI in direct response to the controller of the second RBS receiving the RSI from the controller of the first RBS.

The communication device specific reference signal may be a reference signal for use by a second communication device, such as a demodulation reference signal that the second communication device uses to demodulate a signal.

In another aspect, a base station system for controlling dynamically the power at which a communication device transmits an uplink signal is provided. In some embodiments, the base station system is configured to: detect a first uplink signal transmitted by the communication device; determine the power of the detected signal; use the determined power of the detected signal to determine whether the communication device should transmit a second uplink signal at a power different than the power at which the communication device transmitted the first uplink signal; and in response to determining that the communication device should transmit the second uplink signal at a different power: (i) transmit, to the communication device, reference signal information (RSI) identifying transmission resources, and (ii) transmit a communication device specific reference signal using the identified transmission resources.

Other aspects, embodiments, and features are described below.

BRIEF DESCRIPTION OF DRAWINGS

Embodiments will now be described in more detail in relation to the accompanying drawings, in which.

DETAILED DESCRIPTION

Figure 1:
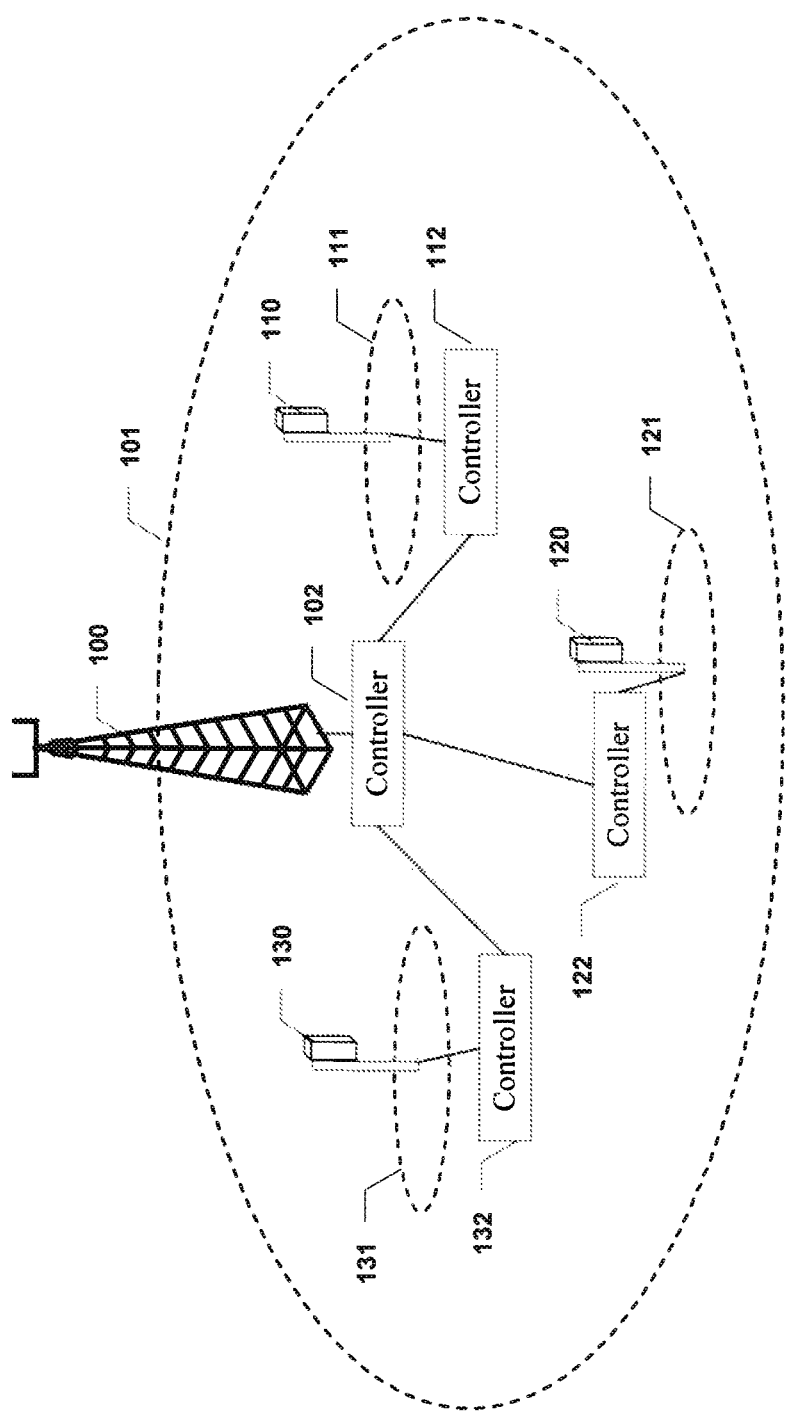
FIG. 1 is an architecture overview of a macro and low power RBS deployment.
Figure 2:
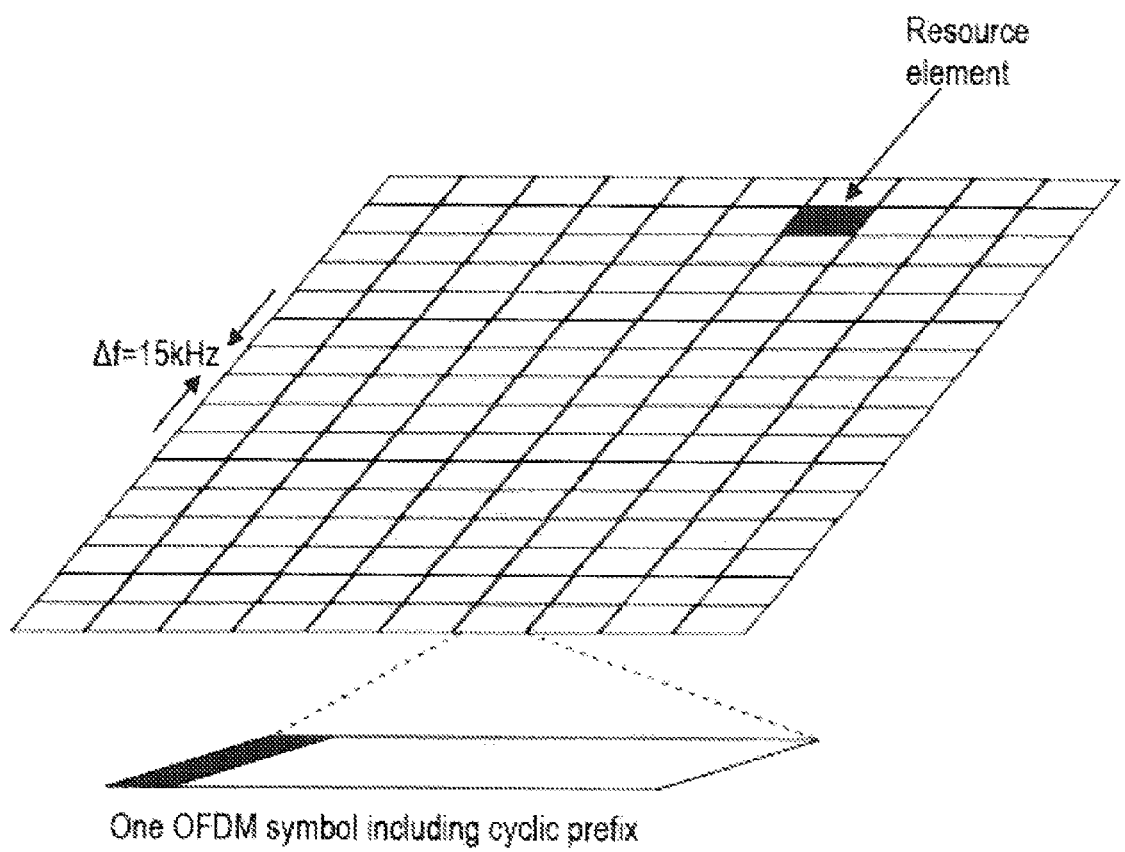
FIG. 2 is an exemplifying LTE downlink physical resource.
Figure 3:
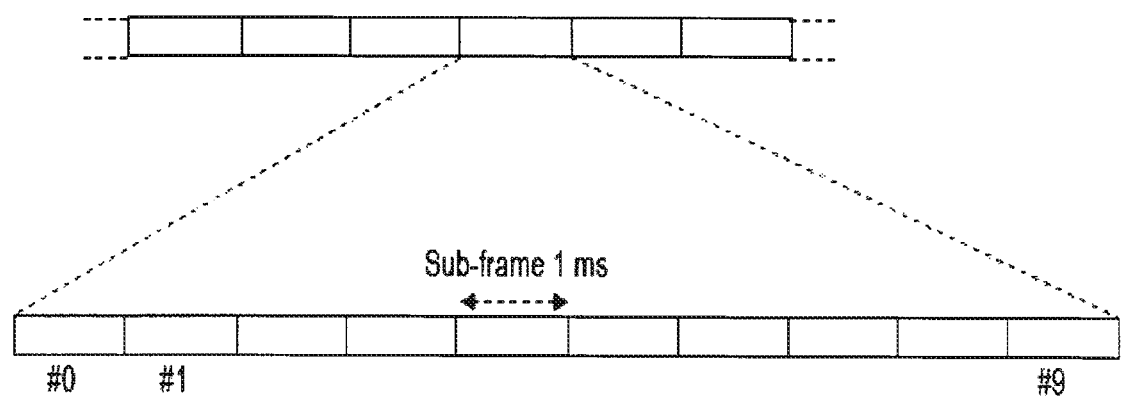
FIG. 3 illustrates the LTE time-domain structure.
Figure 4:
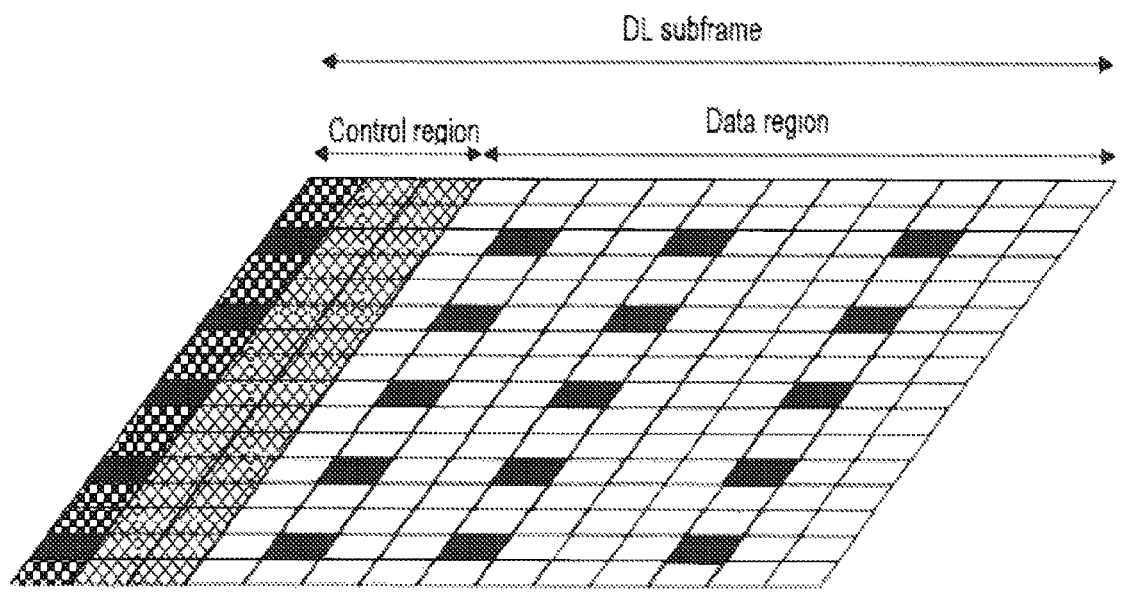
FIG. 4 illustrates mapping of LTE physical control channels, data channels and cell specific reference signals within a downlink subframe.
Figure 5:
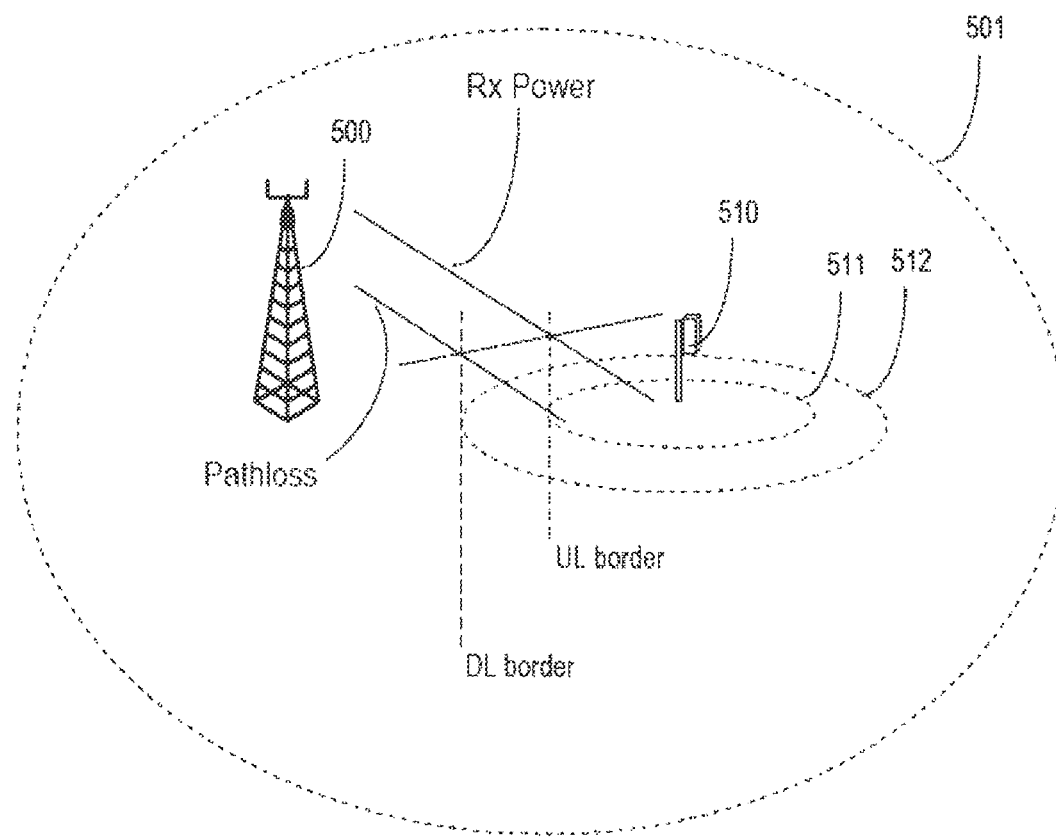
FIG. 5 illustrates uplink and downlink coverage in a heterogeneous network deployment.
Figure 6:
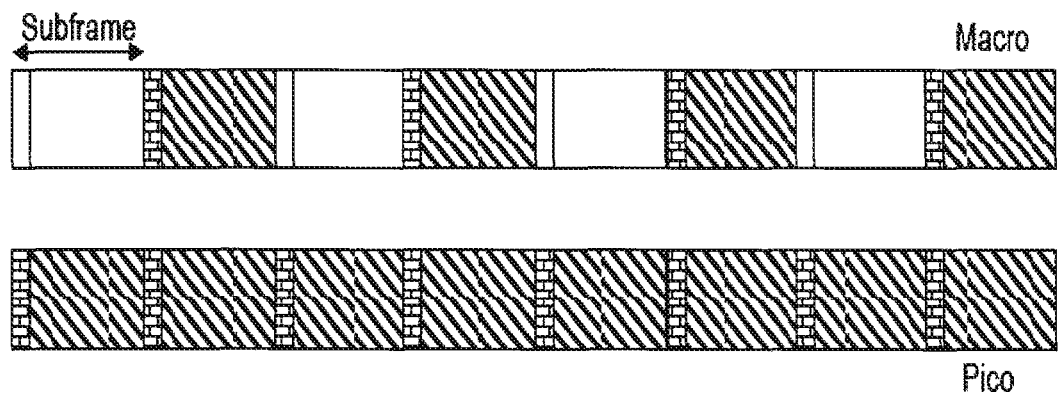
FIG. 6 illustrates ICIC using low interference subframes in downlink.
Figure 7:
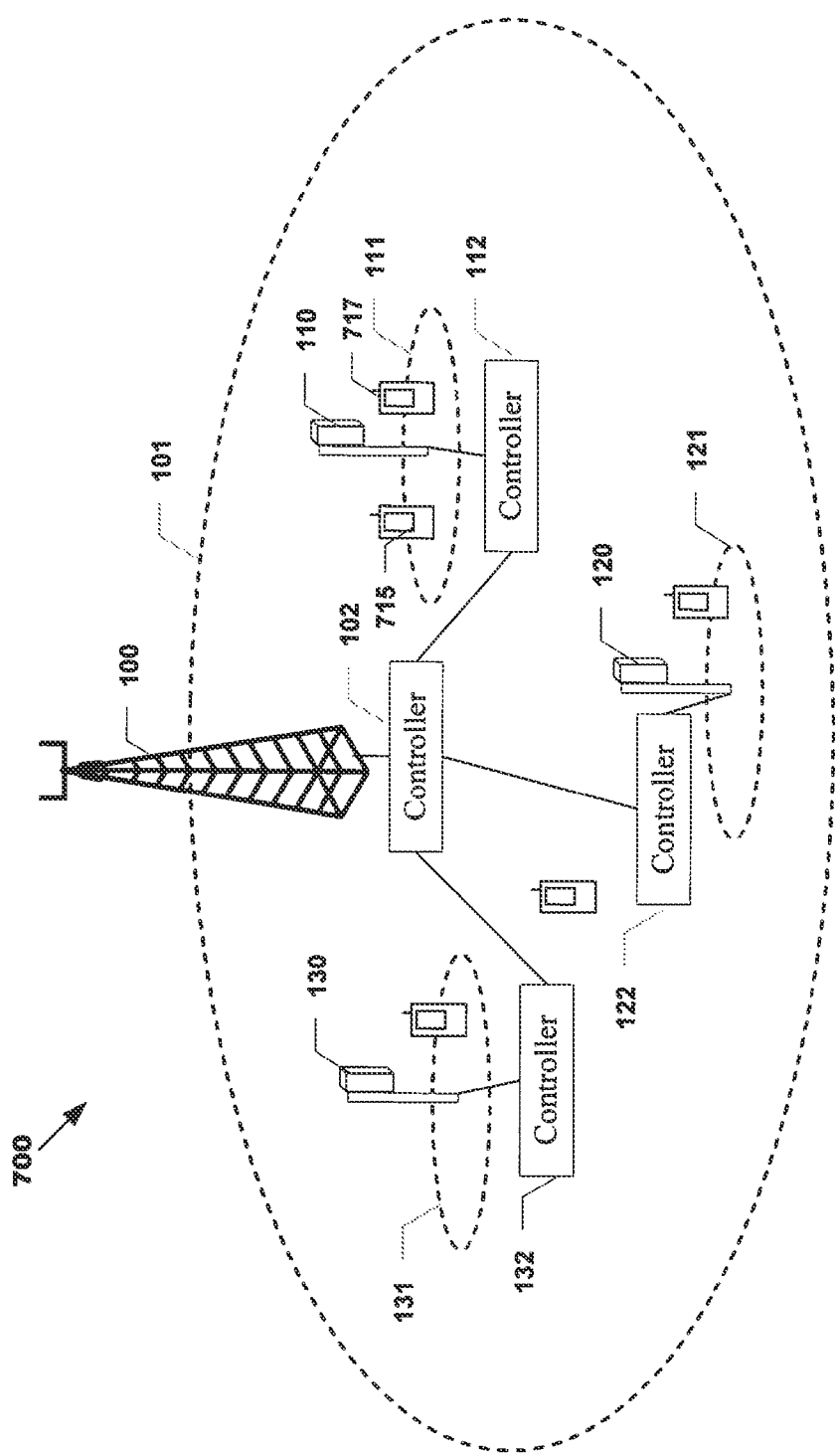
FIG. 7 is an exemplifying heterogeneous network deployment.

Disclosed herein are methods and base station systems for controlling dynamically the power at which a communication device (e.g., a UE) transmits an uplink signal. FIG. 7 illustrates an example base station system 700 in which the disclosed methods may be implemented. Advantageously, base station system 700 may be configured to (a) detect whether a UE is not using an appropriate amount of power to transmit uplink data (e.g., detect whether a UE is using too much power to transmit the uplink data) and (b) in response, transmit a power control RS (PCRS) (e.g., a UE specific PCRS) and instruct the UE to detect the power of the transmitted PCRS and use the detected power in setting its own transmit power, by, for example, determining a PL based on the detected power of the PCRS. In this way, for example, base station system 700 can dynamically cause a UE to transmit using less (or more) power by, for example, transmitting a UE specific PCRS with relatively high (or low) actual power (or reported power) than a previously transmitted RS (such as a CRS), which may or may not have been specific to the UE, or transmitting the UE specific PCRS from an RBS closer to (or farther from) the UE than the RBS that transmitted the previous RS, thereby causing the UE to calculate a lower PL (or higher PL), which can cause the UE to lower (or raise) its transmit power.

This proposed solution is extremely flexible. It enables system 700 to change the basis of the uplink power control on a subframe time scale, or even within a subframe from one resource block to another. Another advantage is that the embodiments decouple uplink power control from the downlink CRSs and provides a dynamic and extremely flexible way for the network to control how the UEs' open loop power control should function, something that may be of importance in future alternative deployments. Additionally, it enables the possibility to adapt power control to dynamics in traffic conditions seen by a scheduler. Time domain wise, since power control is concerned with long term fading changes relating to UE positions, the PCRSs typically need not be sent as often as the current CRSs, which are sent every subframe. The PCRS may also be re-used time-frequency wise within the cell if they are orthogonal in the spatial domain. They can even be sent on the same resources from different nodes from one subframe to the next, enabling a very fast way of controlling the uplink transmissions.

Further, proper area splitting gains for the uplink are enabled by controlling the transmit power of a UE towards the node that has the lowest path loss, minimizing interference both to the own cell and others. Yet another advantage is the conservation of UE battery life. The innovation further provides the option for the network to control the trade-off between periodicity and density of power control measurements versus increased control channel overhead.

As shown in FIG. 7, exemplary base station system 700 includes a macro RBSs 100 (e.g., a macro eNB) and a number of pico RBSs 110, 120, and 130. Of course, base station system 700 may include any number of macro and/or pico RBSs. As also shown, a controller may be associated with (e.g., connected to or part of) each RBS. More specifically, as shown, controller 102 is associated with RBS 100, controller 112 is associated with RBS 110, controller 122 is associated with RBS 120, and controller 132 is associated with RBS 130. In alternative embodiments, RBSs 100, 110, 120 and 130 may all be associated with the same controller. As used herein, the term RBS is used broadly. Thus, an RBS may be an eNodeB, an RRU, or any type of transmission point (e.g., an antenna).

Figure 8:
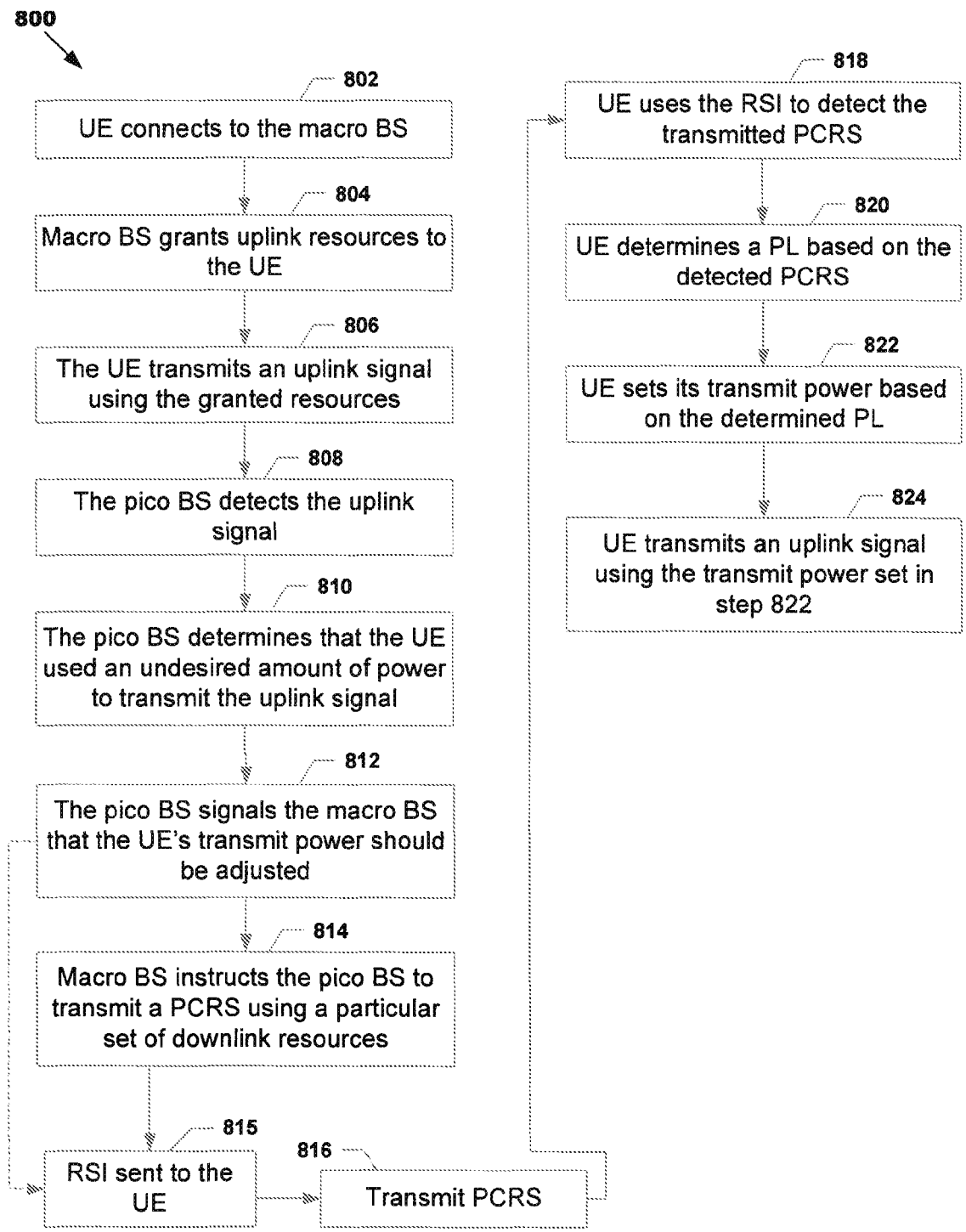
FIG. 8 is a flowchart of a method according to an exemplifying embodiment.

Turning now to FIG. 8, FIG. 8 is a flow chart illustrating a process 800, according to some embodiments, for controlling dynamically the power at which a communication device (e.g., a UE, such as UE 715) transmits an uplink signal.

Process 800 may begin in step 802, where UE 715 connects to macro RBS 100. For example, as described above, in step 802 UE 715 may: find and acquire synchronization to RBS 100, receive and decode system information needed to communicate with RBS 100, and access RBS 100 by a random-access procedure. In step 804, RBS 100 may grant uplink resources to UE 715, thereby allowing UE 715 to transmit uplink data in an uplink signal.

In step 806, UE 715 transmits the uplink signal using the granted resource(s). The power at which UE 715 transmits the uplink signal may have been determined based on a CRS that was transmitted by macro RBS 100, as described in the background section.

In step 808, a pico RBS (e.g., RBS 110) detects the uplink signal, determines the power of the uplink signal and compares the power of the received uplink signal against a power threshold. In step 810, RBS 110, based on the comparison, determines that UE 715 is transmitting using an undesired amount of power (e.g., too much power). For example, in step 801, RBS 110 may determine that the power of the received uplink signal exceeds the threshold. In step 812, RBS 110, in response to determining that UE 715 used an undesired amount of power to transmit the uplink signal and that the transmission power of UE 715 should be adjusted, signals RBS 100 that UE 715's transmit power should be adjusted. For example, in step 812, controller 112 may send to controller 102 a message containing information indicating that the transmission power of UE 715 should be decreased.

In step 814, in response to learning that the transmission power of UE 715 should be adjusted (e.g., in response to receiving the message), RBS 100 instructs RBS 110 to transmit a PCRS (e.g., a UE specific PCRS). For example, in step 814, controller 102 of RBS 100 may transmit to controller 112 of RBS 110 a message identifying the PCRS and the particular set of downlink resources (e.g., one or more resource elements) and instructing RBS 110 to transmit the identified PCRS using the identified downlink resources.

In step 815, a message containing reference signal information (RSI) is transmitted to UE 715, by, for example, RBS 100 or RBS 110. The message may be a layer 3 message, such as a radio resource control (RRC) message. The RSI included in the message indicates the resources (e.g., resource elements) that will be used to transmit a PCRS (see step 816). The message may also contain reference power information identifying a reference power (e.g., information identifying the nominal power of the PCRS or the actual power at which the PCRS will be transmitted in step 816).

In step 816, in response to the message received in step 814, RBS 110 transmits a PCRS using the downlink resources. For example, in cases where RBS 100 transmits to RBS 110 a message identifying a PCRS and downlink resources, RBS 110 may transmit the identified PCRS using the identified resources. As another example, instead of transmitting an RS identified by RBS 100, RBS 110 may transmit a demodulation RS (DMRS) as the PCRS. The DMRS may be used by UE 715 to determine a PL value and subsequently the output power, and may also be used by another UE being served by RBS 110 (e.g., UE 717). In such a case, the RSI provided to UE 715 identifies the resources used to transmit the DMRS so that UE 715 can detect the DMRS.

In some alternative embodiments, RBS 100 does not perform step 814 and RBS 110 does not perform step 816, rather, RBS 100, in response to learning that the transmission power of UE 715 should be decreased, transmits the PCRS using a particular set of downlink resources. This alternative embodiment is represented by the dotted line connecting step 812 directly with step 815, thereby bypassing step 814.

In yet another embodiment, RBS 100 performs step 814 and transmits the PCRS along with RBS 110 (as well as zero or more additional RBSs). For example, in this embodiment, in step 814, RBS 100 instructs not only RBS 110 to transmit the PCRS using the particular resources, but may also instruct one or more other RBS (e.g., RBS 120 and 130) to also transmit the PCRS using the same resources. In this way, UE 715 can combine the transmitted RSs in determining a measure of uplink transmission power level.

In step 818, in response to receiving the message, UE 715 uses the RSI to detect the PCRS transmitted in step 816.

In step 820, UE 715 determines a PL based on the detected PCRS. For example, in step 820, UE 715 determines the power of the received PCRS and determines the PL by determining the difference between the identified reference power and the determined power of the received PCRS. In step 822, UE 715 may adjust its transmit power based on the determined PL. In step 824, UE 715 transmits uplink data using the new power level. The uplink data transmitted in step 824 may be the same uplink data transmitted in step 806.

As seen from the above, UE 715 may adjust its transmit power dynamically based on a PCRS specific to the UE. That is, for example, as soon as base station system 700 detects that a UE is transmitting with too much power, system 700 can react dynamically by immediately transmitting a UE specific reference signal and instructing the UE to detect the power of the signal and adjusts its transmit power based on the actual or reported power of the UE specific reference signal.

Figure 9:
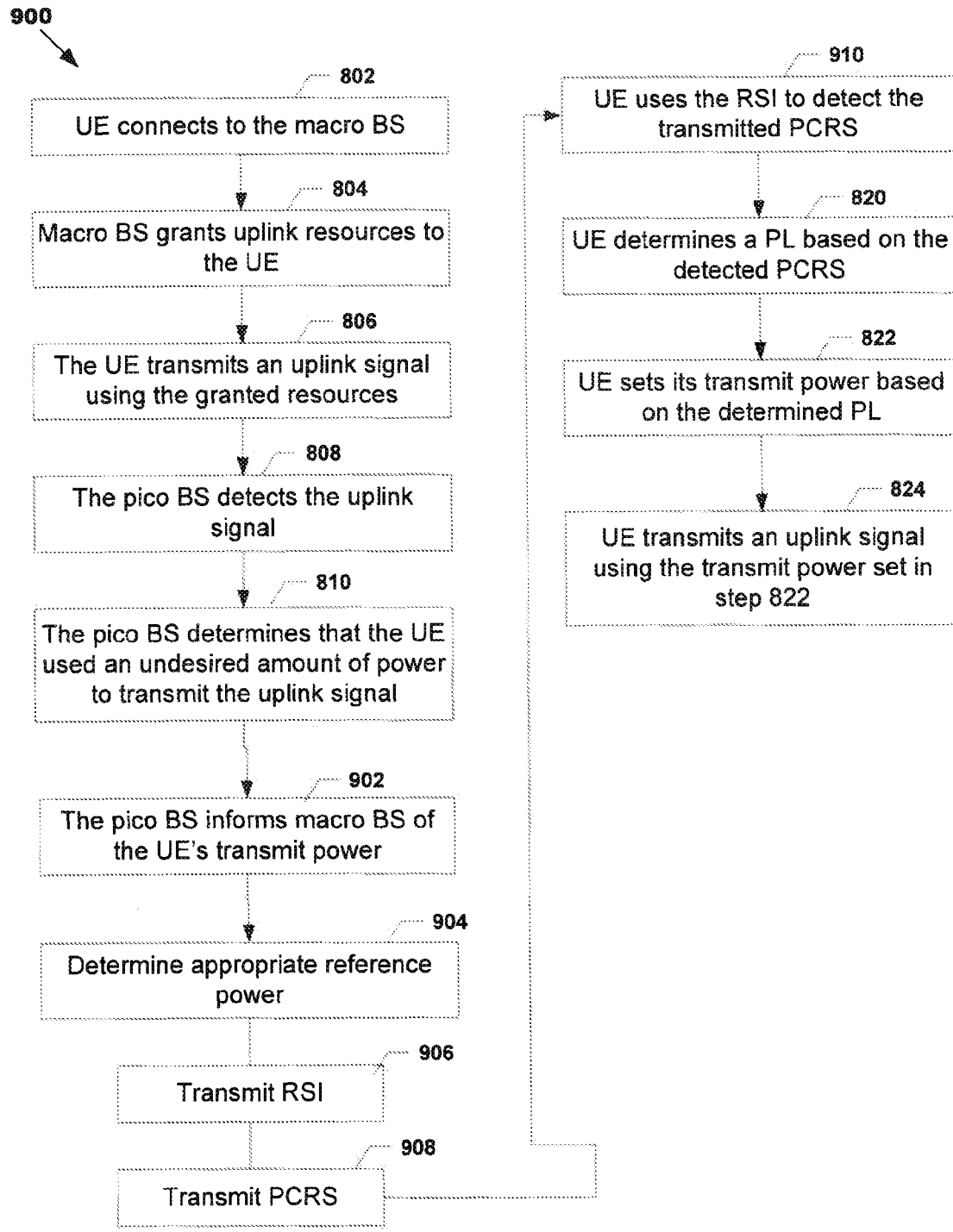
FIG. 9 is a flowchart of a method according to another exemplifying embodiment.

FIG. 9 is a flow chart illustrating a process 900, according to other embodiments, for controlling dynamically the power at which UE 715 transmits an uplink signal. Process 900, like process 800 begins with steps 802-810, which are described above. In step 902, in response to determining that UE 715 used an undesired amount of power to transmit its uplink data (e.g., the received power of an uplink signal transmitted from UE 715 exceeds a threshold), pico RBS 110 informs macro RBS of the UE's transmit power. In step 904, in response to receiving the UE power information from pico RBS 110, macro RBS 100 selects an appropriate reference power value based on the UE's transmit power. For example, if the UE's transmit power is too high, RBS 100 may select a relatively low or high reference power. In step 906, macro RBS 100 transmits to UE 715 a message containing the selected reference power value (the message may also contain RSI that indicates resources that will be used to transmit a PCRS specific to UE 715). In step 908, macro RBS 100 transmits a PCRS, which may be a PCRS specifically for only UE 715.

The power at which macro RBS transmits the PCRS may or may not be equal to the selected reference power. For example, to avoid interference, macro RBS 100 may transmit the PCRS using the same power level it used to transmit the immediately previous RS (e.g., CRS) that UE 715 used to set its uplink transmit power. In this case, the selected reference power value will be lower than the actual transmit power of the PCRS so that UE 715 will calculate a lower PL value, and hence, reduce its output power. In step 910, UE 715 detects the PCRS transmitted in step 908. After step 910, process 900 continues with steps 820-824, which are described above.

Figure 10:
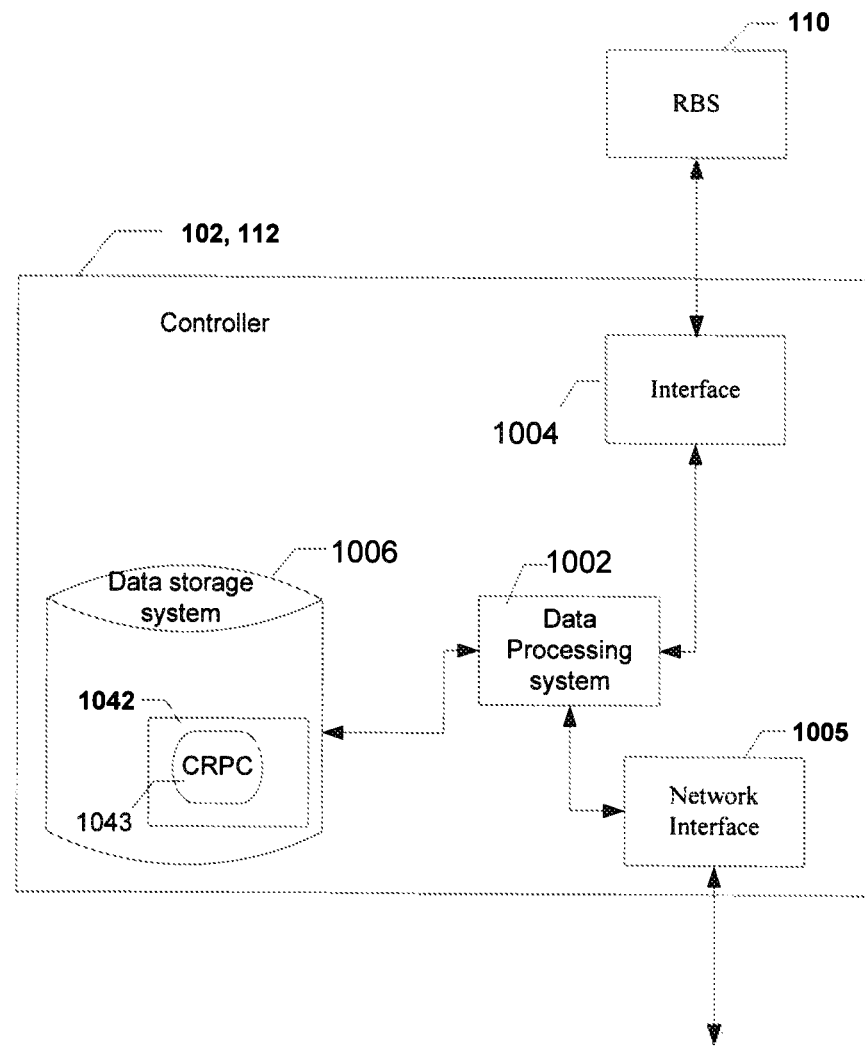
FIG. 10 is a block diagram illustrating a controller according to an exemplifying embodiment.

Referring now to FIG. 10, FIG. 10 illustrates a block diagram of a controller (e.g., controller 102 or 112), according to some embodiments. As shown in FIG. 10, the controller 102, 112 may include: a data processing system 1002, which may include one or more data processing devices each having one or more microprocessors and/or one or more circuits, such as an application specific integrated circuit (ASIC), Field-programmable gate arrays (FPGAs), etc.; a network interface 1005 for receiving messages from other controllers or network devices and transmitting messages to other controller or network devices; an interface 1004 for receiving data from and transmitting data to RBS 110; a data storage system 1006, which may include one or more computer-readable mediums, such as non-volatile storage devices and/or volatile storage devices (e.g., random access memory (RAM)).

In embodiments where data processing system 1002 includes a processor (e.g., a microprocessor), a computer program product is provided, which computer program product includes: computer readable program code 1043, which implements a computer program, stored on a computer readable medium 1042, such as, but not limited, to magnetic media (e.g., a hard disk), optical media (e.g., a DVD), memory devices (e.g., random access memory), etc. In some embodiments, computer readable program code 1043 is configured such that, when executed by data processing system 1002, code 1043 causes the processing system 1002 to perform steps described above (e.g., steps describe above with reference to the flow chart shown in FIG. 8 and/or the flow chart shown in FIG. 9).

In other embodiments, controller 102, 112 may be configured to perform steps described above without the need for code 1043. For example, data processing system 1002 may consist merely of specialized hardware, such as one or more application-specific integrated circuits (ASICs). Hence, the features of the present invention described above may be implemented in hardware and/or software. For example, in some embodiments, the functional components of controller 102, 112 described above may be implemented by data processing system 1002 executing computer instructions 1043, by data processing system 1002 operating independent of any computer instructions 1043, or by any suitable combination of hardware and/or software.

While various embodiments of the present invention have been described above, it should be understood that they have been presented by way of example only, and not limitation. Thus, the breadth and scope of the present invention should not be limited by any of the above-described exemplary embodiments. Moreover, any combination of the above-described elements in all possible variations thereof is encompassed by the invention unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for controlling dynamically the power at which a communication device transmits an uplink signal, comprising:
   transmitting data to the communication device from a first radio base station (RBS);
   determining, based on the power of a first uplink signal received at a second RBS and transmitted by the communication device, whether the transmission power of the communication device should be altered;
   in response to a determination that the transmission power of the communication device should be altered, transmitting from the first RBS and/or the second RBS, a communication device specific reference signal (CDS-RS), wherein
   the communication device is configured such that the communication device receives the CDS-RS, determines a measure of uplink transmission power level based on the received CDS-RS, and transmits a second uplink signal at the determined power level.

2. The method of claim 1, wherein, in response to a determination that the transmission power of the communication device should be altered, the first RBS is used to transmit the communication device specific reference signal.

3. The method of claim 1, wherein, in response to a determination that the transmission power of the communication device should be altered, the second RBS is used to transmit the communication device specific reference signal.

4. The method of claim 3, wherein, in response to the determination that the transmission power of the communication device should be altered, a controller of the second RBS transmits a message to a controller of the first RBS and the second RBS is used to transmit the reference signal after the message is transmitted to the first RBS.

5. The method of claim 4, wherein, in response to receiving the message transmitted from the second RBS, the first RBS is used to transmit to the communication device reference signal information (RSI), wherein the RSI indicates a downlink transmission resource that the second RBS will use to transmit the reference signal.

6. The method of claim 5, wherein,
   in response to receiving the message transmitted from the second RBS, the controller of the first RBS transmits the RSI to the controller of the second RBS, and
   the second RBS is used to transmit the reference signal using the resource identified by the RSI in direct response to the controller of the second RBS receiving the RSI from the controller of the first RBS.

7. The method of claim 3, wherein the communication device specific reference signal is a demodulation reference signal for aiding a second communication device to demodulate a signal transmitted to the second communication device.

8. The method of claim 1, wherein the communication device specific reference signal is transmitted by both the first RBS and the second RBS in response to a determination that the transmission power of the communication device should be altered.

9. The method of claim 8, wherein the communication device is configured such that the communication device combines the reference signal transmitted from the first RBS with the reference signal transmitted by the second RBS and uses the combined reference signals to determine the measure of uplink transmission power level.

10. The method of claim 1, wherein
    the step of determining whether the transmission power of the communication device should be altered comprises:
    determining the power of the first uplink signal and determining whether the determined power of the first uplink signal exceeds a threshold.

11. The method of claim 1, wherein
    the method further comprises transmitting to the communication device a power reference value as a result of the determination that the transmission power of the communication device should be altered, and
    the communication device is configured to determine the measure of the uplink transmission power level by i) determining a power value representing the power of the received CDS-RS and ii) determining a path loss (PL) value by calculating a difference between the determined power value and the received power reference value.

12. The method of claim 1, further comprising:
    in response to a determination that the transmission power of the communication device should be altered, i) transmitting to the communication device information identifying a set of one or more resource elements of a downlink transmission subframe and ii) transmitting to the communication device the CDS-RS using the identified resource elements.

13. The method of claim 1, wherein the CDS-RS is a predefined signal known to the communication device prior to either the first or second base station transmitting said CDS-RS to the communication device.

14. The method of claim 1, wherein the communication device is configured such that the communication device measures the power of the received CDS-RS and sets its own transmit power based on the measured power of the received CDS-RS.

15. A base station system for controlling dynamically the power at which a communication device transmits an uplink signal, wherein the base station system comprises:
    one or more radio base stations (RBSs), the one or more RBSs collectively comprising electronic circuitry configured to:
    detect a first uplink signal transmitted by the communication device;
    determine the power of the detected signal;
    use the determined power of the detected signal to determine whether the communication device should transmit a second uplink signal at a power different than the power at which the communication device transmitted the first uplink signal; and
    in response to determining that the communication device should transmit the second uplink signal at a different power: (i) transmit to the communication device reference signal information (RSI) identifying a set of one or more downlink transmission resources, and (ii) transmit a communication device specific reference signal (RS) using the identified downlink transmission resources, wherein
    the communication device specific RS is a predefined signal known to the communication device prior to the base station system transmitting said device specific RS to the communication device.

16. The base station system of claim 15, wherein:
    the one or more RBSs comprise a first radio base station (RBS) and a second RBS,
    the first RBS is configured to transmit the communication device specific reference signal using the identified downlink transmission resources in response to the base station system determining that the communication should transmit the second uplink signal at a different power, and the second RBS is also configured to transmit the communication device specific reference signal using the identified downlink transmission resources in response to the base station system determining that the communication device should transmit the second uplink signal at a different power.

17. The base station system of claim 15, wherein
the one or more RBSs comprise a first RBS and a second RBS, and
a controller of the second RBS is configured to:
(i) use the determined power of the detected first uplink signal to determine whether the communication device should transmit the second uplink signal at a different power, and
(ii) transmit a message to a controller of the first RBS in response determining that the communication device should transmit the second uplink signal at a different power.

18. The base station system of claim 17, wherein
the controller of the first RBS is configured to use the first RBS to transmit the RSI to the communication device in response to receiving the message transmitted from the controller of the second RBS.

19. The base station system of claim 17, wherein
the controller of the first RBS is configured to transmit the RSI to the second RBS in response to receiving the message transmitted from the controller of the second BS.

20. The base station system of claim 19, wherein the second RBS is configured to transmit the RSI using the identified downlink transmission resources in response to receiving the RSI transmitted from the controller of the first RBS.

21. The base station system of claim 20, wherein the communication device specific reference signal is a demodulation reference signal for use by a second communication device in demodulating a signal.

22. The base station system of claim 15, wherein each identified downlink resource is a resource element of a sub-frame comprising a plurality of resource elements.

23. The base station system of claim 15, wherein the communication device is configured such that the communication device measures the power of the received communication device specific reference signal (CDS-RS) and sets its own transmit power based on the measured power of the received CDS RS.

24. A method for dynamically controlling the power at which a communication device transmits an uplink signal, wherein the method comprises:
detecting a first uplink signal transmitted by the communication device;
determining the power of the detected signal;
using the determined power of the detected signal to determine whether the communication device should transmit a second uplink signal at a power different from the power at which the communication device transmitted the first uplink signal; and
in response to determining that the communication device should transmit the second uplink signal at a different power:
(i) transmitting to the communication device reference signal information (RSI) identifying a set of one or more downlink transmission resources, and
(ii) transmitting a communication device specific reference signal (RS) using the identified downlink transmission resources, wherein
the communication device specific RS is a predefined signal known to the communication device prior to the base station system transmitting said device specific RS to the communication device.

25. The method of claim 24, further comprising:
transmitting, from a first radio base station (RBS), the communication device specific reference signal using the identified downlink transmission resources in response to one of a first radio base station (RBS) and a second RBS determining that the communication should transmit the second uplink signal at a different power, and
transmitting, from a second RBS, the communication device specific reference signal using the identified downlink transmission resources in response to one of the first RBS and the second RBS determining that the communication device should transmit the second uplink signal at a different power.

26. The method of claim 24, further comprising:
using the determined power of the detected first uplink signal to determine, at a second radio base station (RBS), whether the communication device should transmit the second uplink signal at a different power, and
transmitting, from the second RBS, a message to a first RBS in response to determining that the communication device should transmit the second uplink signal at a different power.

27. The method of claim 26, further comprising:
the first RBS transmitting to the communication device the RSI in response to the first RBS receiving the message transmitted from the second RBS.

28. The method of claim 27, further comprising transmitting the RSI from the first RBS to the second RBS in response to receiving the message transmitted from the second BS.

29. The method of claim 28, further comprising transmitting the RSI from the second RBS using the identified downlink transmission resources in response to receiving the RSI from the first RBS.

30. The method of claim 29, wherein the communication device specific reference signal is a demodulation reference signal for aiding a second communication device to demodulate a signal transmitted to the second communication device.

31. The method of claim 26, wherein each identified downlink transmission resource is a resource element of a downlink subframe comprising a plurality of resource elements.

* * * * *